(12) United States Patent
Kim et al.

(10) Patent No.: US 11,054,021 B2
(45) Date of Patent: Jul. 6, 2021

(54) DIAL TYPE SHIFT LEVER APPARATUS

(71) Applicants: Hyundai Motor Company, Seoul (KR); Kia Motors Corporation, Seoul (KR)

(72) Inventors: Bum Jun Kim, Bucheon-si (KR); Eun Sik Kim, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 145 days.

(21) Appl. No.: 16/585,309

(22) Filed: Sep. 27, 2019

(65) Prior Publication Data
US 2020/0284339 A1 Sep. 10, 2020

(30) Foreign Application Priority Data
Mar. 8, 2019 (KR) .......................... 10-2019-0027026

(51) Int. Cl.
| | |
|---|---|
| *F16H 59/04* | (2006.01) |
| *G05G 5/06* | (2006.01) |
| *G05G 5/03* | (2008.04) |
| *G05G 5/00* | (2006.01) |
| *G05G 1/08* | (2006.01) |

(52) U.S. Cl.
CPC .............. *F16H 59/04* (2013.01); *G05G 1/08* (2013.01); *G05G 5/005* (2013.01); *G05G 5/03* (2013.01); *G05G 5/06* (2013.01); *G05G 2505/00* (2013.01)

(58) Field of Classification Search
CPC ............ G05G 1/08; G05G 1/10; G05G 5/005; G05G 5/03; G05G 5/04; G05G 5/06; G05G 2505/00; F16H 59/04; F16H 59/08; F16H 2059/081; F16H 61/24; F16H 2061/241; F16H 2061/243; F16H 2061/247; H01H 2003/008
See application file for complete search history.

(56) References Cited

U.S. PATENT DOCUMENTS

| | | | | |
|---|---|---|---|---|
| 2008/0000762 | A1* | 1/2008 | Kurihara | .................. H01H 5/02 200/293 |
| 2015/0369357 | A1* | 12/2015 | Lee | ......................... F16H 63/42 74/504 |
| 2016/0245396 | A1* | 8/2016 | Behounek | ............... F16H 61/24 |
| 2017/0175883 | A1* | 6/2017 | Watanabe | ............... F16H 61/22 |
| 2018/0372216 | A1* | 12/2018 | Yamanaka | .............. F16H 61/24 |

FOREIGN PATENT DOCUMENTS

KR 10-1315493 B1 9/2013

* cited by examiner

*Primary Examiner* — Richard W Ridley
*Assistant Examiner* — Brian J McGovern
(74) *Attorney, Agent, or Firm* — Morgan, Lewis & Bockius LLP

(57) ABSTRACT

A dial type shift lever apparatus warns and limits a driver of mischievous manipulation of a rotation knob, preventing a mal-operation of gear shift and preventing a printed circuit board (PCB) circuit from being overloaded due to excessive manipulation of the rotation knob.

13 Claims, 3 Drawing Sheets

DIAL TYPE SHIFT LEVER APPARATUS

CROSS REFERENCE TO RELATED APPLICATION

The present application claims priority to Korean Patent Application No. 10-2019-0027026, filed Mar. 8, 2019, the entire contents of which is incorporated herein for all purposes by this reference.

BACKGROUND OF THE INVENTION

Field of the Invention

The present invention relates to a dial type shift lever apparatus configured for limiting malicious manipulation of a dial type shift lever.

Description of Related Art

In general, a transmission device of a vehicle is broadly classified into an automatic transmission and a manual transmission, and as the automatic transmission, an automatic transmission using a planet gear and a continuously variable transmission using a continuously variable transmission device have been used.

Recently, a shift by wire system for controlling a vehicle transmission system electronically instead of mechanically has been developed, and in this regard, the shift by wire system refers to a transmission system for electronically controlling gear shift using an actuator and an electronic shift lever, for electrically operating a mechanical connection structure of a transmission and a shift lever, and an electric control unit (ECU).

When a position change of a shift lever occurs, the shift by wire transmission system converts the changed position of the shift lever into an electric signal using a position sensor device, inputs the signal to a transmission control unit (TCU), and performs gear shift according to control of the TCU. Compared with a conventional mechanical shift lever system, the shift by wire transmission system is advantageously excellent in terms of lever operating force or operating sensitivity, and enables gear shift via simple manipulation of a switch button.

According to recent trends, a dial type shift lever has been developed to enhance utilization of a console space and to reduce a package of a shift lever system. The dial type shift lever has a problem in that the durability of a circuit of a printed circuit board (PCB) is degraded because a driver arbitrarily and frequently manipulates a shift lever. That is, the dial type shift lever is configured differently from the conventional shift lever, and thus, the driver may perform mischievous manipulation of the shift lever. For example, when a driver mischievously puts a shift lever in a boundary region, in which operating sensitivity is formed, while pressing a brake pedal to stop a vehicle in a state in which a gear stage is D, shift feeling is not smoothly generated, and thus, a mal-operation of the shift lever occurs.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dial type shift lever apparatus configured for preventing a mal-operation of a shift lever of a driver and preventing overload of a printed circuit board (PCB) circuit due to excessive manipulation of a shift lever with respect to a dial shift lever.

According to an exemplary embodiment of the present invention, a dial type shift lever apparatus may include a rotation knob which is rotatable in a shift lever case to select a gear stage, provides shift feeling by a shift feeling unit during rotation, and has a null section at a point at which shift feeling is provided, a friction device mounted in the shift lever case and including a friction rod that generates frictional force in a response that the friction device is moved to the rotation knob to contact with the rotation knob during an operation, and a controller that receives positional information related to the rotation knob, determines current manipulation of the rotation knob to be malicious manipulation when the rotation knob is maintained in the null section or repeatedly enters the null section, and controls the friction device to make the friction rod contact with the rotation knob when the current manipulation is determined to be malicious manipulation.

The shift feeling unit may include a detent groove portion which is disposed in the shift lever case and in which a plurality of detent grooves is formed in a rotation direction of the rotation knob, and a bullet which is mounted at the rotation knob, is rotatable along with the rotation knob, and is elastically inserted into the detent grooves to be caught by the plurality of detent grooves.

The null section of the rotation knob may be a point at which the bullet of the shift feeling unit enters a protrusion section formed between the plurality of detent grooves.

The friction device may include a driving unit which is fixed to the shift lever case and is operated in a response to a signal of the controller being input thereto, and a friction rod that protrudes or is retracted from the driving unit and is linearly movable and may include a friction member which is formed of a frictional material at an end portion thereof.

A shaft that extends toward a transmission housing from an axis center and is formed in a cylindrical shape may be formed on the rotation knob, and rod of the friction device may be configured to be movable toward a peripheral surface of the shaft.

The shaft may have a peripheral surface which is repeatedly curved.

The controller may be configured to determine current manipulation of the rotation knob to be malicious manipulation when a rotation position of the rotation knob is maintained in a null section for a predetermined reference time.

The controller may be configured to determine current manipulation of the rotation knob to be malicious manipulation when the rotation knob repeatedly enters a null section a preset number of times or greater within a preset time.

During determining the malicious manipulation of the rotation knob, the controller may be configured to control a friction device with a pre-stored initial setting value to apply frictional force as the friction rod contacts the rotation knob from a non-contact state.

When the controller controls the friction device with the initial setting value and then the malicious manipulation is continuously maintained for a predetermined time, the controller may be configured to control the friction device to be driven with a reinforcement setting value for allowing the friction rod to contact with the rotation knob with higher frictional force than the initial setting value.

A reinforcement setting value preset in the controller may be set to stepwise increase frictional force in a response to continuous maintenance of the malicious manipulation.

A vibration unit of generating vibration may be connected to the rotation knob, and the controller may be configured to control the vibration unit to generate vibration in the rotation knob when a limit setting value for allowing the friction rod to contact with the rotation knob with higher frictional force than the reinforcement setting value is set and a reinforcement setting value is stepwise increased to reach the limit setting value.

During determining the malicious manipulation of the rotation knob, the controller may be configured to control an operation of a warning unit that is configured to warn a driver of the malicious manipulation of the rotation knob through a warning light or a warning horn of the warning unit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
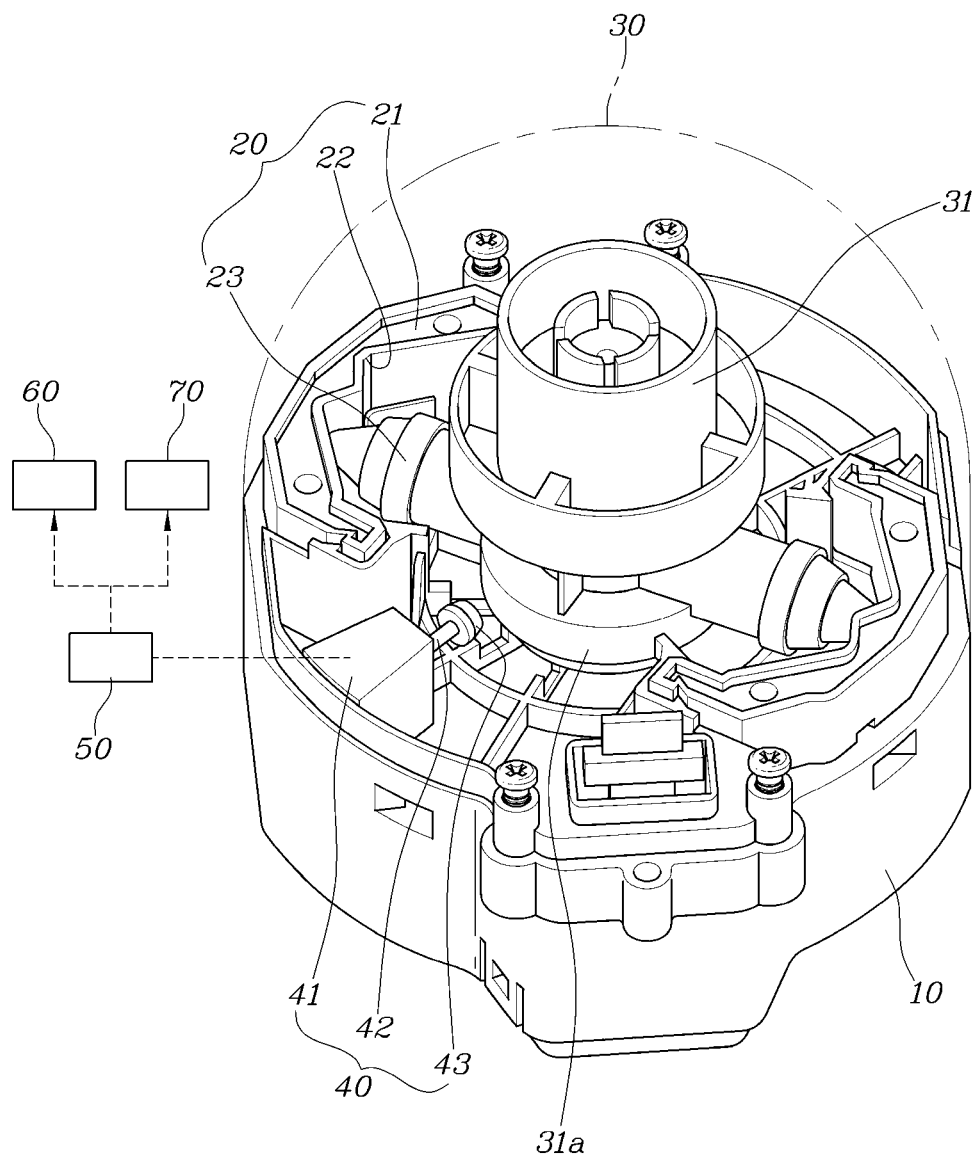
FIG. 1 is a diagram showing a dial type shift lever apparatus according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a dial type shift lever apparatus according to exemplary embodiments of the present invention will be described with reference to the accompanying drawings.

Figure 2:
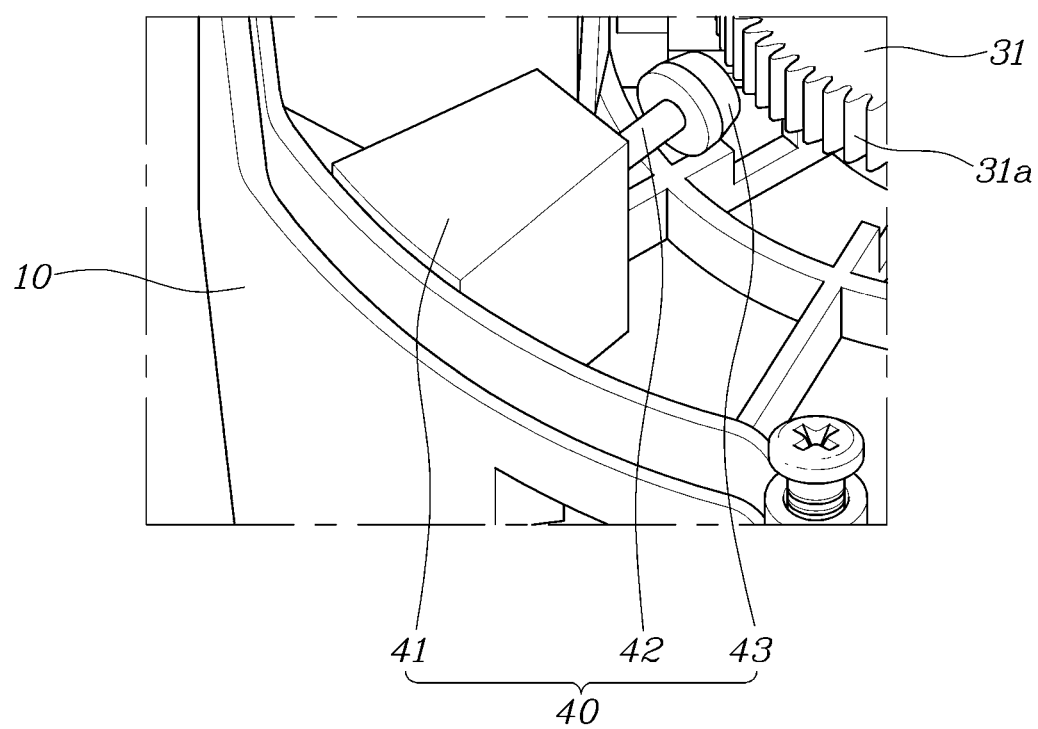
FIG. 2 is a diagram for explanation of the dial type shift lever apparatus shown in FIG. 1.
Figure 3:
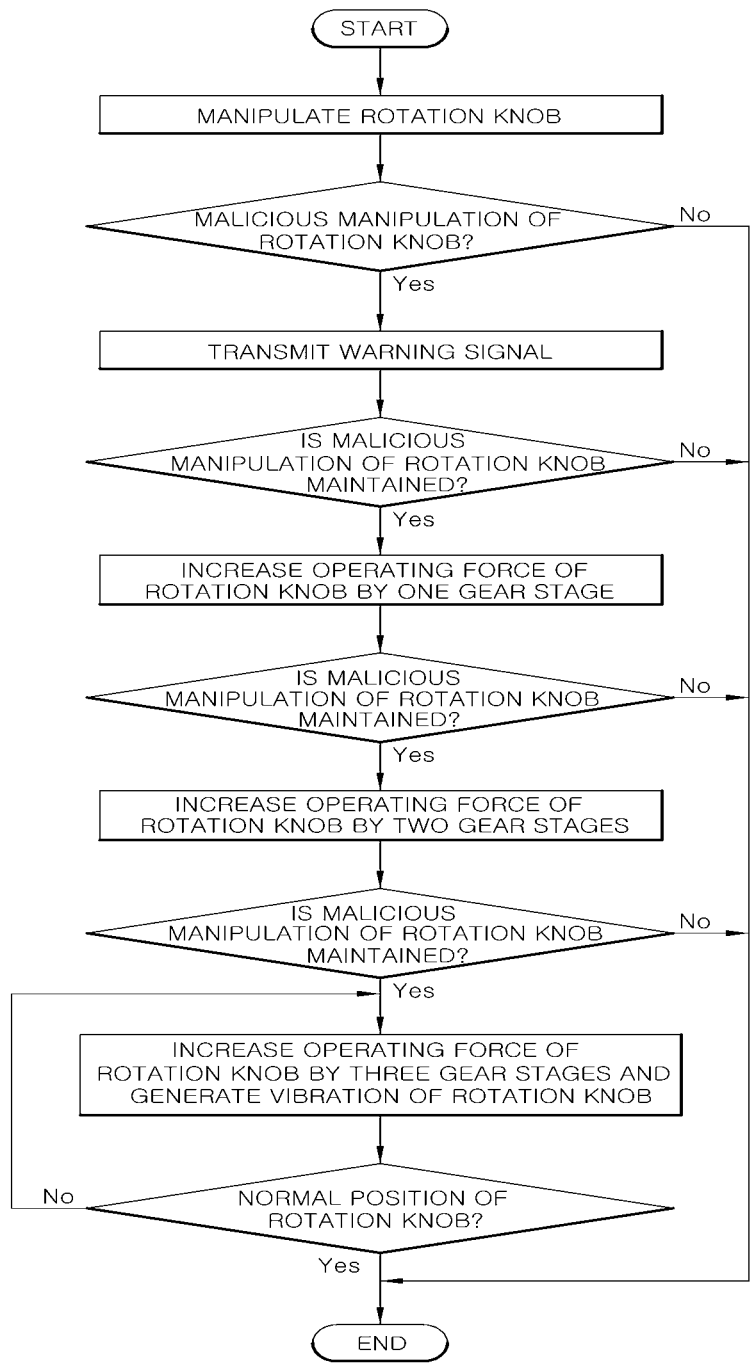
FIG. 3 is a flowchart of driving of a dial type shift lever apparatus according to an exemplary embodiment of the present invention.

FIG. 1 is a diagram showing a dial type shift lever apparatus according to an exemplary embodiment of the present invention. FIG. 2 is a diagram for explanation of the dial type shift lever apparatus shown in FIG. 1. FIG. 3 is a flowchart of driving of a dial type shift lever apparatus according to an exemplary embodiment of the present invention.

As shown in FIG. 1, the dial type shift lever apparatus according to an exemplary embodiment of the present invention may include a rotation knob 30 which is rotated in a shift lever case 10 to select a gear stage, provides shift feeling by a shift feeling unit 20 during rotation, and has a null section at a point at which shift feeling is provided, a friction device 40 disposed in the shift lever case 10 and including a friction rod 42 that generates frictional force as the friction device 40 is moved to the rotation knob 30 to contact with the rotation knob 30 during an operation, and a controller 50 that receives positional information related to the rotation knob 30, determines current manipulation of the rotation knob to be malicious manipulation when the rotation knob 30 is maintained in the null section or repeatedly enters the null section, and controls the friction device 40 to make the friction rod 42 contact with the rotation knob 30 when the current manipulation is determined to be malicious manipulation.

The present invention relates to a dial type shift lever, and in the instant case, as the rotation knob 30 is rotated in the shift lever case 10, gear stages D, N, and R may be selected. In the case of gear stage N in the rotation knob 30, the shift feeling unit 20 may provide shift feeling, gear stage N may include gear stages Nr and Nd, and a current gear stage may be returned to gear stages Nr and Nd in the case of gear shift to gear stage R or D. The rotation knob 30 may be rotatably mounted in the shift lever case 10 through a shaft 31 and may be restored to an original position thereof through a separate spring. The structure in which the rotation knob 30 is rotatably mounted in the shift lever case 10 may be applied in various forms.

The present invention may provide the friction device 40 mounted in the shift lever case 10 and including the friction rod 42 that generates frictional force as the friction device 40 is moved to the rotation knob 30 to contact with the rotation knob 30 during an operation to prevent malicious manipulation of the rotation knob 30. The friction device 40 may limit mischievous manipulation of the rotation knob 30 by a driver and may increase operating force of the rotation knob 30 as the friction rod 42 contacts the rotation knob 30 to increase frictional force. Accordingly, manipulation of the rotation knob 30 of the driver may be difficult, and thus, mischievous manipulation or excessive manipulation of the rotation knob 30 may be prevented.

The friction device 40 may be controlled to be operated by the controller 50. Here, the controller 50 may include a printed circuit board (PCB) and may receive the positional information related to the rotation knob 30 to determine whether the rotation knob 30 is maintained in a null section or repeatedly enters the null section. In the instant case, when the rotation knob 30 is maintained in the null section or repeatedly enters the null section, current manipulation may be determined to be malicious manipulation of the rotation knob 30, and when current manipulation is determined to be malicious manipulation, the controller 50 may control the friction device 40 to allow the friction rod 42 to contact with the rotation knob 30, and thus, operating force of the rotation knob 30 may be increased to enable the driver to recognize malicious manipulation.

Accordingly, the driver's mischievous manipulation of the rotation knob 30 may be prevented, preventing a mal-operation of gear shift and preventing a PCB circuit from being overloaded due to excessive manipulation of the rotation knob 30.

The aforementioned present invention is described now in detail. As shown in FIG. 1, the shift feeling unit 20 may include a detent groove portion 21 which is mounted in the shift lever case 10 and in which a plurality of detent grooves 22 is formed in a rotation direction of the rotation knob 30, and a bullet 23 which is mounted at the rotation knob 30, is rotated along with the rotation knob 30, and is elastically inserted into the detent grooves 22 to be caught by the plurality of detent grooves 22.

Accordingly, the bullet 23 which is rotated along with the rotation knob 30 may be moved in the detent grooves 22 of the detent groove portion 21, and thus, shift feeling may be formed to form operating sensitivity of the rotation knob 30. Here, the bullet 23 may be elastically supported by a separate spring to be smoothly passed over a protrusion section formed between the plurality of detent grooves 22, and the detent grooves 22 may be formed in sections corresponding to gear stages Nr and Nd, and opposite lateral end portions of the detent groove portion 21 may correspond to gear stages R and D.

Accordingly, the null section of the rotation knob 30 may be a point at which the bullet 23 of the shift feeling unit 20 enters the protrusion section between the plurality of detent grooves 22. At the opposite lateral end portions of the detent groove portion 21, a section prior to entrance into gear stage D or R may also be set to the null section. The null section may be a hysteresis section in which gear shift is not performed to a specific gear stage, and when the rotation knob 30 enters the null section, gear shift may not be performed and the controller 50 may recognize gear shift to another gear stage.

As shown in FIG. 2, the friction device 40 may include a driving unit 41 which is fixed to the shift lever case 10 and is operated in a response to a signal of the controller 50 being input thereto, and the friction rod 42 that protrudes or retracts from the driving unit 41 and is linearly moved and includes a friction member 43 which is formed of a frictional material at an end portion thereof.

That is, the driving unit 41 may be formed of a solenoid, and the friction member 43 formed of a rubber material may be included in the friction rod 42 which is linearly moved in the driving unit 41. Accordingly, when the driving unit 41 receives a signal of the controller 50 to make the friction rod 42 protrude, the friction member 43 included in the friction rod 42 may contact with the rotation knob 30 to generate frictional force, increasing operating force of the rotation knob 30.

The shaft 31 that extends toward a transmission housing from the axis center and is formed in a cylindrical shape may be formed on the rotation knob 30, and the friction rod 42 of the friction device 40 may be configured to be movable toward a peripheral surface 31*a* of the shaft 31.

Accordingly, the rotation knob 30 may be rotatably mounted in the transmission housing using the shaft 31 as a rotation central axis, and when the friction rod 42 of the friction device 40 contacts the peripheral surface 31*a* of the shaft 31, friction force may be applied to the rotation knob 30 to change operating sensitivity due to frictional force of the rotation knob 30. Here, as the shaft 31 of the rotation knob 30 is formed in a cylindrical shape, when the friction rod 42 of the friction device 40 contacts the peripheral surface 31*a*, predetermined frictional force may be maintained and detect of difference in manipulation of the rotation knob 30 may be prevented.

According to another exemplary embodiment of the present invention, the shaft 31 may have a peripheral surface which is repeatedly curved. Accordingly, when the rotation knob 30 is manipulated in a state in which the friction rod 42 of the friction device 40 contacts the shaft 31 of the rotation knob 30, as the friction member 43 of the friction rod 42 passes over a curved surface of the shaft 31, vibration may be generated in the rotation knob 30, and accordingly, the driver may be recognized to maliciously manipulate the rotation knob 30.

According to an exemplary embodiment of the present invention, the controller 50 may receive positional information related to the rotation knob 30 and may determine whether the rotation knob 30 is maintained in the null section or repeatedly enters the null section.

Here, the controller 50 may determine current manipulation of the rotation knob to be malicious manipulation when a rotation position of the rotation knob 30 is maintained in the null section for a predetermined reference time. The reference time pre-stored in the controller 50 may be preset and may be set to about 10 seconds. That is, when the rotation knob 30 is maintained in the null section for a reference time, the controller 50 may determine current manipulation of the rotation knob to be malicious manipulation in which gear shift to a specific gear stage is not performed in a state in which the rotation knob 30 is gripped.

The controller 50 may determine current manipulation of the rotation knob to be malicious manipulation when the rotation knob 30 repeatedly enters the null section a preset number of times or greater within a preset time. A setting time and setting number of times pre-stored in the controller 50 may be preset, and the setting time may be set to 3 seconds and the setting number of times may be set to 3 times. That is, the controller 50 may manipulate the rotation knob 30 and may determine current manipulation of the rotation knob to be malicious manipulation in which gear shift to a specific gear stage is not performed when entrance and separation of the rotation knob 30 to and from the null section are repeatedly performed for a setting number of times within the setting time.

During determining the malicious manipulation of the rotation knob, the controller 50 may control the friction device 40 with a pre-stored initial setting value to apply frictional force as the friction rod 42 contacts the rotation knob 30 from a non-contact state.

That is, when the controller 50 determines whether the aforementioned rotation knob 30 is maintained in the null section or repeatedly such as predetermined times enters the null section and determines current manipulation to be malicious manipulation, the controller 50 may control the friction device 40 to make the friction rod 42 contact with the rotation knob 30. In the instant case, an initial setting value pre-stored in the controller 50 may be a current value applied to the friction device 40 and may be set to a degree by which operating force of the rotation knob 30 is slightly increased. The initial setting value may be a manipulation value of a first gear stage of the friction device 40.

When the controller 50 controls the friction device 40 with the initial setting value and then the malicious manipulation is continuously maintained for a predetermined time, the controller 50 may control the friction device 40 to be driven with a reinforcement setting value for allowing the friction rod 42 to contact with the rotation knob 30 with higher frictional force than the initial setting value.

Accordingly, when malicious manipulation is maintained after operating force is increased by frictional force based on the initial setting value by the rotation knob 30, the controller 50 may drive the friction device 40 with the reinforcement setting value, and thus, the operating force of the rotation knob 30 may be further increased and the driver may recognize malicious manipulation of the rotation knob 30. The reinforcement setting value may be a second gear stage of a higher manipulation value than the initial setting value.

Here, the reinforcement setting value preset in the controller 50 may be set to stepwise increase frictional force in a response to maintenance of malicious manipulation. That is, the controller 50 drives the friction device 40 with the reinforcement setting value, and thus, even if operating force of the rotation knob 30 is increased, when the driver continuously maintains malicious manipulation of the rotation knob 30, the reinforcement setting value may be gradually increased to gradually increase the operating force of the rotation knob 30. Accordingly, the driver may more obviously recognize that operating force of the rotation knob 30 is strengthened and may unhand from the rotation knob 30 to guide the rotation knob 30 to be deviated from the null section.

A vibration unit 60 for generating vibration may be connected to the rotation knob 30. The vibration unit 60 may be mounted in the shift lever case 10 and may generate vibration in the rotation knob 30 to transmit a specific signal to the driver. A device configured for providing vibration to the rotation knob 30 may be various known technologies and a detailed structure thereof is omitted.

When a limit setting value for allowing the friction rod 42 to contact with the rotation knob 30 with higher frictional force than the reinforcement setting value may be preset and a reinforcement setting value is stepwise increased to reach the limit setting value, the controller 50 may control the vibration unit 60 to generate vibration in the rotation knob 30. Here, the limit setting value may be a higher manipulation value of a third gear stage than the reinforcement setting value and may be set to a degree by which manipulation of the rotation knob 30 is difficult and operating force is generated.

Furthermore, the controller 50 may control the vibration unit 60 to generate vibration in the rotation knob 30, and thus, the driver may more obviously recognize malicious manipulation of the rotation knob 30.

During determining the malicious manipulation of the rotation knob, the controller 50 may control an operation of a warning unit 70 that warns the driver of the malicious manipulation of the rotation knob 30 through a warning light or a warning horn of the warning unit. Here, the warning unit 70 may light the warning light in a cluster or may transmit the warning horn through a separate speaker device.

Accordingly, when the driver continuously maintains malicious manipulation of the rotation knob 30, operation force of the rotation knob 30 may be increased, vibration may be transferred to the rotation knob 30, or a signal may be transmitted through the warning light or the warning horn, and thus, the driver may guide complete release of manipulation of the rotation knob 30. Accordingly, the rotation knob 30 may be restored to a normal state out of the null section.

The dial type shift lever apparatus configured with the aforementioned structure may prevent the driver's mischievous manipulation of the rotation knob, preventing a mal-operation of gear shift and preventing a PCB circuit from being overloaded due to excessive manipulation of the rotation knob.

The dial type shift lever apparatus configured with the aforementioned structure may warn and limit the driver of mischievous manipulation of the rotation knob, preventing a mal-operation of gear shift and preventing a PCB circuit from being overloaded due to excessive manipulation of the rotation knob.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift lever apparatus comprising:
   a rotation knob which is rotatable in a shift lever case to select a gear stage, provides shift feeling by a shift feeling unit during rotation, and has a null section at a point at which shift feeling is provided;
   a friction device mounted in the shift lever case and including a friction rod that generates frictional force in a response that the friction device is moved to the rotation knob to contact with the rotation knob during an operation thereof; and
   a controller configured to receive positional information related to the rotation knob, to determine current manipulation of the rotation knob to be malicious manipulation in a response that the rotation knob is maintained in the null section or repeatedly enters the null section, and to control the friction device to make the friction rod contact with the rotation knob in a response that the current manipulation is determined to be malicious manipulation.

2. The shift lever apparatus of claim 1, wherein the shift feeling unit includes:
   a detent groove portion which is disposed in the shift lever case and in which a plurality of detent grooves is formed in a rotation direction of the rotation knob; and
   a bullet which is mounted at the rotation knob, is rotatable along with the rotation knob, and is elastically inserted into the detent grooves to be caught by the plurality of detent grooves.

3. The shift lever apparatus of claim 2,
   wherein the null section of the rotation knob is a point at which the bullet of the shift feeling unit enters a protrusion section formed between the plurality of detent grooves.

4. The shift lever apparatus of claim 1, wherein the friction device further includes:
   a driving unit which is connected to the controller, mounted to the shift lever case and operated in a response to a signal of the controller; and a friction rod that is coupled to the driving unit and configured to protrude or be retracted from the driving unit, wherein the friction rod includes a friction member formed of a frictional material at an end portion of the friction rod to be selectively contact with the rotation knob.

5. The shift lever apparatus of claim 1, wherein the rotation knob includes a shaft that extends toward a transmission housing from an axis center thereof and is formed in a cylindrical shape, and wherein the friction rod of the friction device is configured to be selectively movable toward a peripheral surface of the shaft to contact with the peripheral surface of the shaft.

6. The shift lever apparatus of claim 1, wherein the shaft has a peripheral surface which is repeatedly curved.

7. The shift lever apparatus of claim 1, wherein the controller is configured to determine the current manipulation of the rotation knob to be the malicious manipulation in a response that a rotation position of the rotation knob is maintained in a null section for a predetermined reference time.

8. The shift lever apparatus of claim 1, wherein the controller is configured to determine the current manipulation of the rotation knob to be the malicious manipulation in a response that the rotation knob repeatedly enters a null section a predetermined number of times or greater within a predetermined time.

9. The shift lever apparatus of claim 1, wherein during determining the malicious manipulation of the rotation knob, the controller is configured to control the friction device with a pre-stored initial setting value to apply the frictional force when the friction rod contacts the rotation knob from a non-contact state thereof.

10. The shift lever apparatus of claim 9, wherein, when the controller controls the friction device with the pre-stored initial setting value and then the malicious manipulation is continuously maintained for a predetermined time, the controller is configured to control the friction device to be driven with a reinforcement setting value for allowing the friction rod to contact with the rotation knob with higher frictional force than the pre-stored initial setting value.

11. The shift lever apparatus of claim 10, wherein the reinforcement setting value of the controller is set to stepwise increase frictional force in a response to continuous maintenance of the malicious manipulation.

12. The shift lever apparatus of claim 11, wherein a vibration unit of generating vibration is connected to the rotation knob; and wherein the controller is connected to the vibration unit and configured to control the vibration unit to generate vibration in the rotation knob in a response that a limit setting value for allowing the friction rod to contact with the rotation knob with higher frictional force than the reinforcement setting value is set and the reinforcement setting value is stepwise increased to reach the limit setting value.

13. The shift lever apparatus of claim 1, wherein during determining the malicious manipulation of the rotation knob, the controller is configured to control an operation of a warning unit that is configured to warn a driver of the malicious manipulation of the rotation knob through a warning light or a warning horn of the warning unit.

* * * * *